(12) United States Patent
Lähteenmäki et al.

(10) Patent No.: US 11,840,429 B2
(45) Date of Patent: Dec. 12, 2023

(54) FRAME STRUCTURE OF HOIST

(71) Applicant: KONECRANES GLOBAL CORPORATION, Hyvinkää (FI)

(72) Inventors: Atte Lähteenmäki, Hyvinkää (FI); Teppo Lindberg, Hyvinkää (FI); Mikko Jutila, Hyvinkää (FI); Mikko Ritala, Hyvinkää (FI); Mikko Mykrä, Hyvinkää (FI); Henri Helkiö, Hyvinkää (FI); Henri Kokko, Hyvinkää (FI); Niko Laukkanen, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 853 days.

(21) Appl. No.: 16/771,050

(22) PCT Filed: Dec. 12, 2018

(86) PCT No.: PCT/FI2018/050908
§ 371 (c)(1),
(2) Date: Jun. 9, 2020

(87) PCT Pub. No.: WO2019/115877
PCT Pub. Date: Jun. 20, 2019

(65) Prior Publication Data
US 2021/0179394 A1    Jun. 17, 2021

(30) Foreign Application Priority Data
Dec. 12, 2017   (FI) ..................... 20176106

(51) Int. Cl.
*B66C 9/02*    (2006.01)
*B61B 3/00*    (2006.01)
*B65G 9/00*    (2006.01)

(52) U.S. Cl.
CPC .................. *B66C 9/02* (2013.01); *B61B 3/00* (2013.01); *B65G 9/002* (2013.01)

(58) Field of Classification Search
CPC ........... B66C 9/02; B66C 11/04; B66C 11/06; B66C 9/14; B65G 9/002; B61B 3/00
See application file for complete search history.

(56) References Cited

U.S. PATENT DOCUMENTS 1,551,308 A    8/1925   Howard
2,905,806 A *  9/1959   Tunney ................... F21V 21/34
                                                  248/323

(Continued)

FOREIGN PATENT DOCUMENTS

CN    2775022 Y    4/2006
CN    1939834 A    4/2007

(Continued)

OTHER PUBLICATIONS

Chinese Office Action and Search Report for Chinese Application No. 201880079754.7, dated Aug. 4, 2021, with an English translation.

(Continued)

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

A frame structure of a hoist, the frame structure including a support frame structure, a bearing wheel arrangement fastened to the support frame structure by suspenders to support the hoist on a main support structure and to move the hoist on the main support structure, whereby the bearing wheel arrangement includes, in the movement direction of the hoist, bearing wheels arranged on opposite sides thereof, and upper sheave arrangements secured to the support frame (Continued)

structure, wherein the support frame structure includes two plates arranged opposite and at a distance from each other, the upper parts of the plates bent towards each other, and in the support frame structure there is arranged an axle passing through both plates, on which axle a sheave is arranged between the plates, and the bent upper parts of the plates are detachably fastenable by a wedge locking to the suspender in order to adjust the mutual distance between the bearing wheels arranged on opposite sides of the support frame structure by means of the suspenders.

12 Claims, 5 Drawing Sheets

(56) References Cited

U.S. PATENT DOCUMENTS

| | | | | |
|---|---|---|---|---|
| 3,974,777 | A * | 8/1976 | Monne | B66C 7/02 |
| | | | | 104/106 |
| 5,669,518 | A * | 9/1997 | Kundel | B66C 7/02 |
| | | | | 212/315 |
| 6,058,849 | A * | 5/2000 | Ostholt | B66C 11/06 |
| | | | | 105/154 |
| 6,499,408 | B1 | 12/2002 | Kundel, Sr. | |
| 7,850,026 | B2 * | 12/2010 | McKay | B66C 11/06 |
| | | | | 104/111 |
| 8,960,459 | B2 * | 2/2015 | Givens | B66C 5/10 |
| | | | | 212/73 |
| 9,663,331 | B2 | 5/2017 | Buhlmayer et al. | |
| 2008/0041806 | A1 | 2/2008 | Birkigt et al. | |
| 2011/0089129 | A1 | 4/2011 | Gouault et al. | |
| 2012/0125875 | A1 | 5/2012 | Richter | |
| 2012/0305869 | A1 | 12/2012 | Cho | |
| 2014/0003902 | A1 | 1/2014 | Inui et al. | |

FOREIGN PATENT DOCUMENTS

| | | |
|---|---|---|
| CN | 102066230 A | 5/2011 |
| CN | 102530724 A | 7/2012 |
| CN | 102712451 A | 10/2012 |
| CN | 103171841 A | 6/2013 |
| DE | 199 18 074 A1 | 10/2000 |
| EP | 1 770 047 A1 | 4/2007 |
| FR | 2 590 881 A1 | 6/1987 |
| GB | 2 158 794 A | 11/1985 |
| WO | WO 2011/105790 A2 | 9/2011 |

OTHER PUBLICATIONS

Chinese Office Action and Search Report for Chinese Application No. 201880079754.7, dated Mar. 4, 2022, with English translation of Chinese Office Action.
Japanese Office Action for Japanese Application No. 2020-532936, dated Sep. 6, 2022, with English translation.
Extended European Search Report for European Application No. 18886788.9, dated Feb. 1, 2021.
International Search Report, issued in PCT/FI2018/050908, dated Mar. 11, 2019.
Written Opinion of the International Searching Authority, issued in PCT/FI2018/050908, dated Mar. 11, 2019.

\* cited by examiner

FRAME STRUCTURE OF HOIST

BACKGROUND OF THE INVENTION

The invention relates to a frame structure of a hoist, the frame structure comprising a support frame structure, a bearing wheel arrangement fastened to the support frame structure by suspenders to support the hoist on a main support structure and to move the hoist on the main support structure, whereby the bearing wheel arrangement comprises, in the movement direction of the hoist, bearing wheels arranged on opposite sides thereof, and the frame structure comprises upper sheave arrangements, secured to the support frame structure.

A crane type often used in industry is a bridge crane which consists of a bridge running on a rail or rails, a trolley running on the bridge, and a hoist for a load, fixed to the trolley. The hoist of a bridge crane is typically a rope crane. It is important for the usability of a crane that it makes efficient use of the available working space.

In such a case, it is advantageous for the structure of the hoist to be such that it allows hoisting a load as high as possible, using the available free height. However, the structure of the hoist needs to be economical to manufacture and reliable.

From the point of view of the installability and maintainability of the hoist, it is important that the structure of the hoist allows the hoist to be adapted on a bridge, main support structure, in a simple and fast manner.

BRIEF DESCRIPTION OF THE INVENTION

An object of the invention is thus to develop a structure of a hoist so that the aforementioned problems may be solved. The object of the invention is achieved by a hoist structure which is characterised by what is disclosed in the independent claims. Preferred embodiments of the invention are disclosed in the dependent claims.

The invention is based on a frame structure of a hoist, the frame structure comprising a support frame structure, a bearing wheel arrangement fastened to the support frame structure by suspenders to support the hoist on a main support structure and to move the hoist on the main support structure, whereby the bearing wheel arrangement comprises, in the movement direction of the hoist, bearing wheels arranged on opposite sides thereof, and upper sheave arrangements, secured to the support frame structure. The support frame structure comprises two plates arranged opposite to and at a distance from each other, the upper parts of the plates bent towards each other, and in the support frame structure there is arranged an axle passing through both plates, on which axle a sheave is arranged between the plates, and the bent upper parts of the plates are detachably fastenable by a wedge locking to the suspender in order to adjust the mutual distance between the bearing wheels arranged on opposite sides by means of the suspenders.

The advantage of the inventive frame structure of a hoist is the small height dimension, allowing hoisting a load as high as possible, making use of the available free height. The structure of the hoist allows the hoist to be adapted on the main support structure in a simple and fast manner.

BRIEF DESCRIPTION OF THE DRAWINGS

The invention will now be described in more detail in connection with preferred embodiments and with reference to the accompanying drawings, in which.

DETAILED DESCRIPTION OF THE INVENTION

Figure 1:
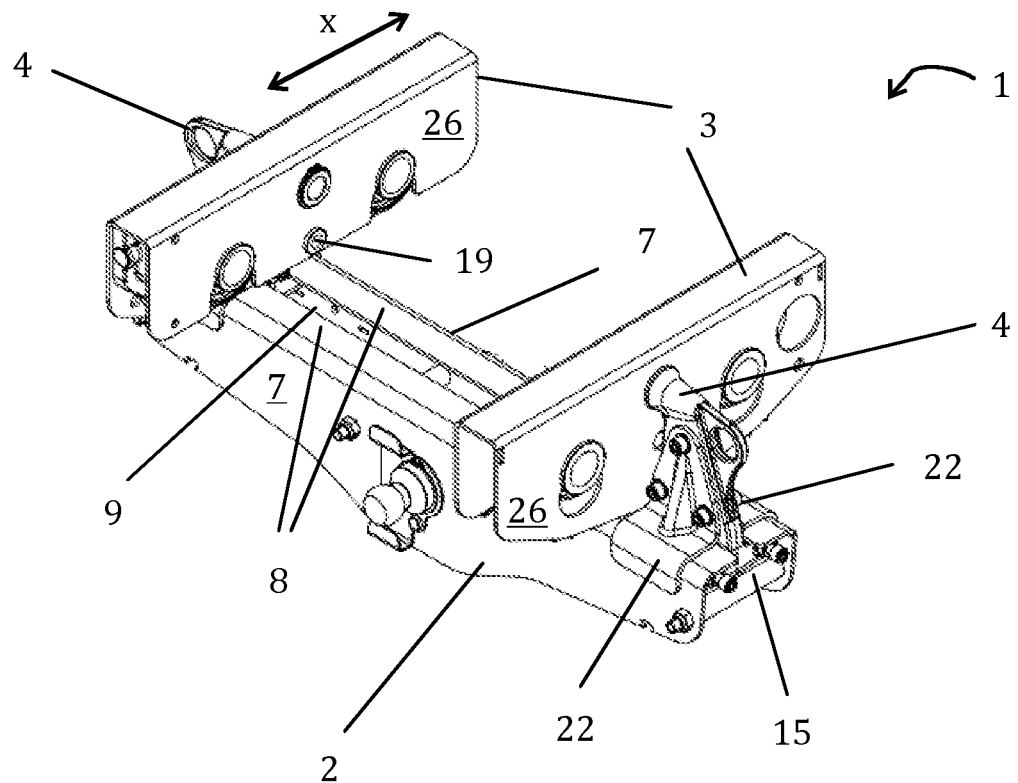
FIG. 1 shows a frame structure of a hoist.
Figure 2:
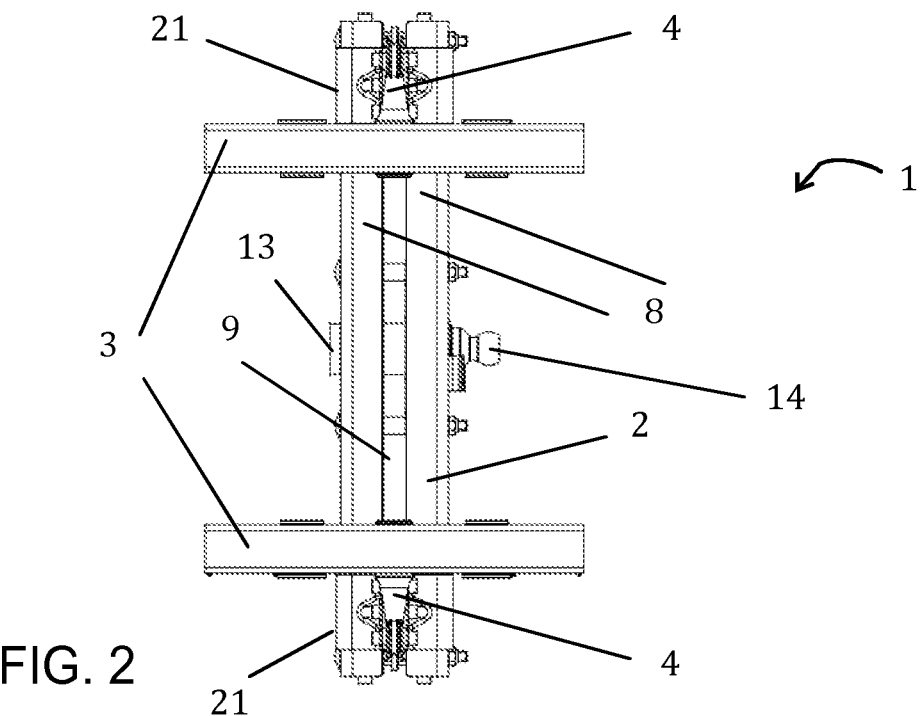
FIG. 2 is a top view of the frame structure of a hoist of FIG. 1.

The frame structure 1 of a hoist may be used, for example, in a trolley of a bridge crane. The trolley moves along a main support structure of a crane. The main support structure typically comprises a profile beam whereby the trolley is supported on a lower flange of the profile beam. So, a main support refers to a supporting structure which, at its simplest, is one beam and in most cases an I beam. The hoisting arrangement of a rope hoist is arranged in a trolley.

FIGS. 1 to 5 show a frame structure 1 of a hoist. The frame structure 1 of a hoist comprises a frame support structure 2, a bearing wheel arrangement 3, and suspenders 4. The bearing wheel arrangement 3 is fixed to the support frame structure 2 by the suspenders 4 to support the hoist on the main supports structure and to move the hoist on the main support structure. The bearing wheel arrangement 3 comprises in the direction of movement x of the hoist bearing wheels 5 arranged on opposite sides thereof. The upper sheave arrangements 6 are fastened to the support frame structure 2. The support frame structure 2 comprises two plates 7 which are arranged face-to-face at a distance from each other. The upper parts 8 of the plates are bent towards each other so that a gap 9 forms between the bent upper parts 8 of the plates 7 of the support frame structure. In the support frame structure 2 there is arranged an axle 10 passing through both plates 7, on which axle 10 at least one sheave 11 is arranged between the plates 7. The bent upper parts 8 of the plates are may be detachably fastened by a wedge locking 29 to the suspender 4 in order to adjust the mutual distance between the bearing wheels 5 arranged on opposite sides by means of the suspender 4.

The trolley of the hoist comprises, in addition to the frame structure 1, also other parts that are not shown in the figures. The trolley comprises a hoisting mechanism which has a rope drum with a rope groove for the hoisting rope. The trolley comprises rope pulley arrangements that have upper sheave arrangements and lower sheave arrangements. Through the rope pulley arrangement, the hoisting rope may be guided from the rope drum to a fastening point. The trolley further has a hoisting member, cooperating with the hoisting rope, to hoist a load. The fastening point of a first end of the hoisting rope may be adapted, depending of the roping arrangement, on the hoisting member or support frame structure 2, for example.

Figure 4:
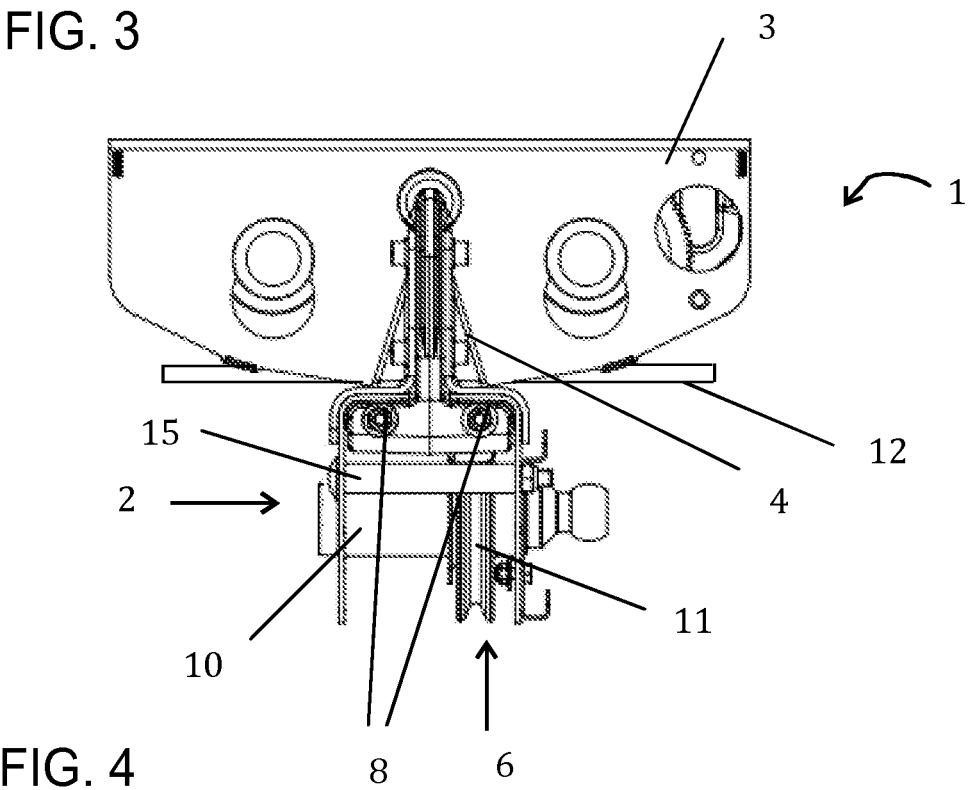
FIG. 4 is a side view of the frame structure of a hoist of FIG. 1.

As shown in FIG. 4, the support frame structure 2, secured to the bearing wheel arrangement 3 by suspenders 4, is placed below the lower flange of the main support structure 12 in its immediate vicinity. In such a case, the location of the sheave 11 between the plates 7 of the support frame structure also becomes closer to the main support structure 12.

According to a preferred embodiment, the upper part 8 of the plate is bent into a substantially horizontal plane. In the figures, the plate 7 of the support frame structure is bent in such a way that the plate 7 is substantially L-shaped, and the plates of the support frame structure are mirror image profiles of each other.

According to an embodiment, the frame structure of a hoist comprises a frame structure of a rope hoist, and at the middle part of the first plate 7 of the support frame structure 2 there is arranged a fastening point 13 for the hoisting rope, to which a free end of the hoisting rope may be attached. The fastening point 13 is advantageously formed to an end of the axle 10 passing through the plates 7 of the support frame structure.

According to an embodiment, there is arranged, at the middle part of a second plate 7 of the support frame structure, a joining point 14 for other parts of the hoist, such as the rope drum of the hoisting rope. The joining point 14 is advantageously formed to an end of the axle 10 passing through the plates 7 of the support frame structure. For example, a second parts entity adapted to move on the wheels may be joined to the joining point 14, to which parts entity the rope drum has been adapted with its drive motors and gears.

According to an embodiment, the two plates 7 of the support frame structure are arranged face-to-face at a distance from each other by means of spacers 15, such as bushings. The location of the spacers 15, bushings, in the height direction h of the support frame structure 2 is so arranged that a lower part 18 of the suspender 4 has room to move in the space left between the spacers 15 and the bent upper parts 8 of the plates.

Figure 3:
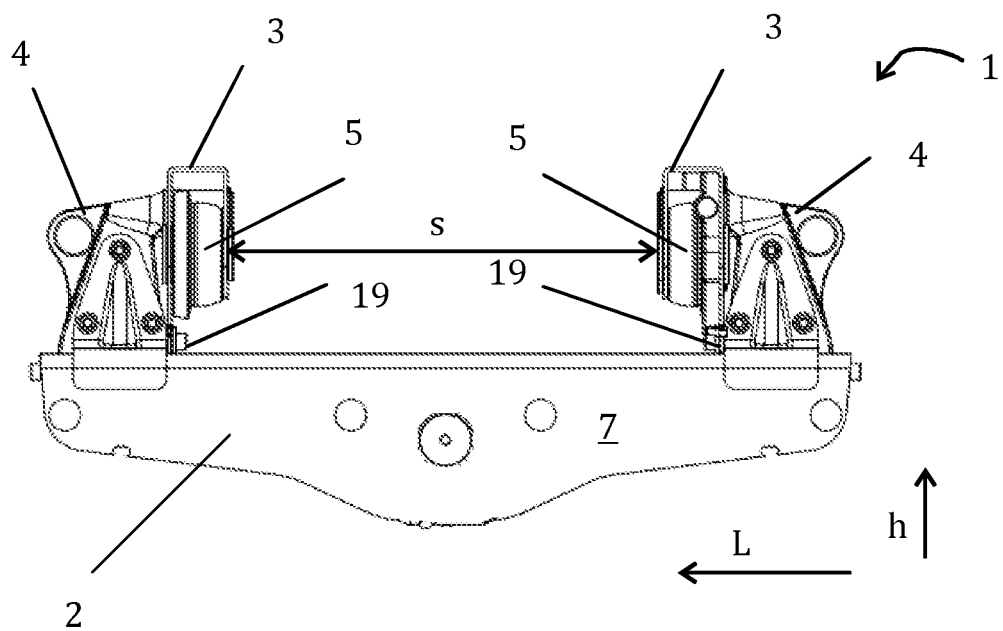
FIG. 3 is a front view of the frame structure of a hoist of FIG. 1.
Figure 6:
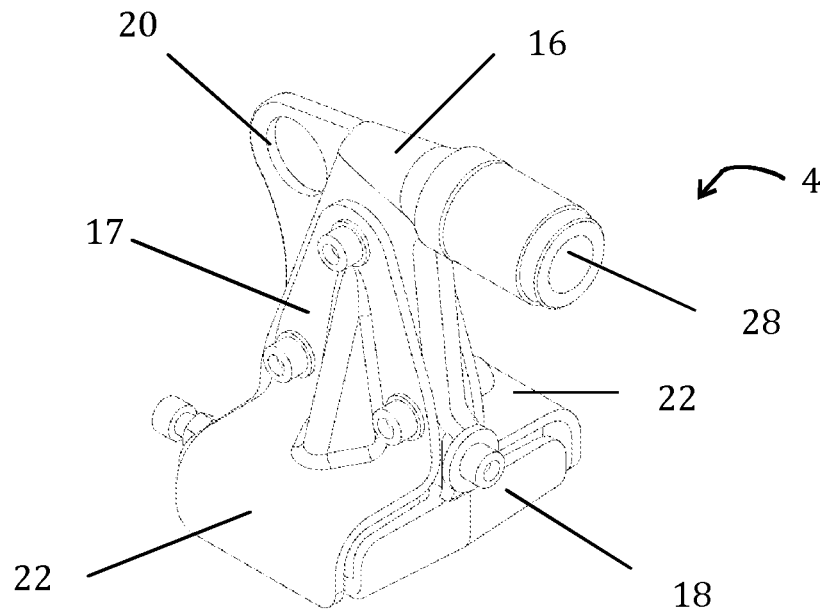
FIG. 6 shows a suspender.
Figure 7:
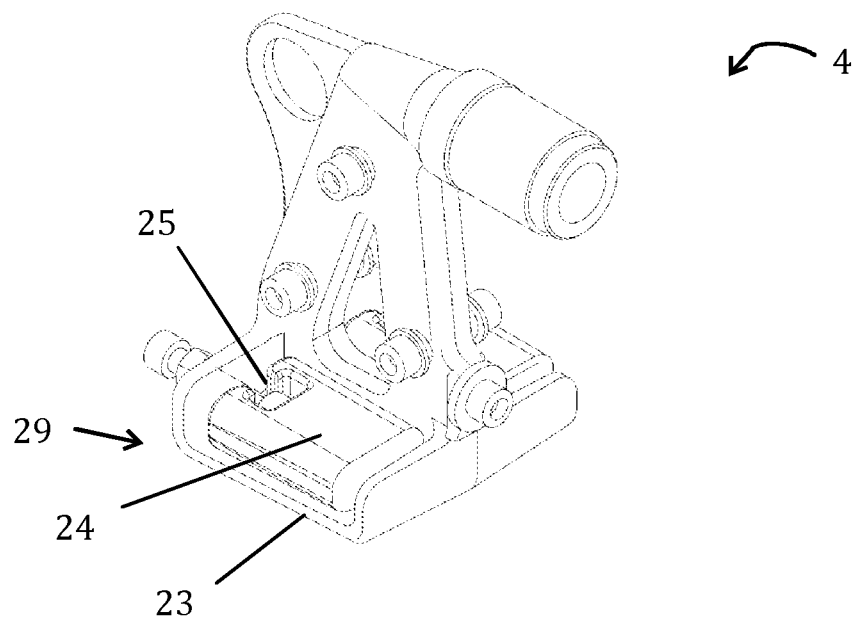
FIG. 7 shows the suspender of FIG. 6.

FIGS. 6 to 7 show the suspender 4 of the frame structure. The suspender 4 comprises an upper part 16, a middle part 17, and a lower part 18. The upper part 16 of the suspender has connecting means to the bearing wheel arrangement 3. According to an embodiment, the suspender 4 is connected by its upper part 16 to the bearing wheel arrangement 3 by an axle joint 28. An axle joint sustains radial forces well. An axle joint is additionally economic to manufacture. Furthermore, an axle joint is a secure joint that does not open by mistake. In connection with the axle joint 28, it is advantageous that the suspender 4 is connected by its middle part 17 to the bearing wheel arrangement 3 by an screw joint 19. This screw joint 19 prevents rotation around the axle joint 28. The screw joint 19 to the bearing wheel arrangement 3 is shown in FIGS. 1 and 3.

In the upper part 16 of the suspender, a hoisting lug 20 may also be formed, for the purpose of installing a hoist, for example.

In the substantially horizontal lower part 18 of the suspender, there are connecting means to the support frame structure 2 of a hoist. The support frame structure 2 of a hoist may be detachably connected by a wedge locking 29 to the suspenders 4 at both of its ends 21. The lower part 18 of the suspender is arranged on the inside of the support frame structure 2, the upper surface of the lower part against the lower surface of the bent upper parts 8 of the plates. The vertical middle part 17 and upper part 16 of the suspender protrude upwards from a gap 9 formed between the bent upper parts 8 of the plates 7 of the support frame structure. The bent upper parts 8 of the plates are arranged between the lower part 18 of the suspender and upper reinforcement plates 22 fastened to the middle part 17 of the suspender.

The upper reinforcement plates 22 covering the lower part 18 of the suspender are set against the upper surfaces of the bent upper parts 8 of the plates 7 of the support frame structure on the outside of the support frame structure 2, transversely in relation to the longitudinal direction L of the plates (FIG. 1). The upper reinforcement plates 22 are connected to the middle part 17 of the suspender 4. The upper reinforcement plates 22 are advantageously formed to extend at least partly over the vertical side surfaces of the plates 7 to improve the sturdiness of the fastening.

FIG. 7 shows the suspender 4 with the upper reinforcement plates 22 removed. The lower part 18 of the suspender comprises a lower reinforcement plate 23 and wedge parts 24. The lower reinforcement plate 23 sets transversely in relation to the longitudinal direction L of the support frame structure 2 below the bent upper parts 8 of both plates. The wedge parts 24 are arranged on both sides of the middle part 17 of the suspender, over the lower reinforcement plate 23. The wedge parts 24 are advantageously placed in compartments 25 formed in the lower reinforcement plate 23. The wedge locking 29 between the suspender 4 and support frame structure 2 is achieved by moving the wedge part 24, thicker at one of its ends, along a sloping surface of the reinforcement plate 23 between the lower reinforcement plate and the bent upper part 8 of the support frame structure. The sloping surface of the lower reinforcement plate 23 may be achieved with a changing material thickness, for example. By loosening the wedge locking 29, the pressure between the suspender 4 and support frame structure 2 is removed, and the suspender 4 may be moved.

Figure 8:
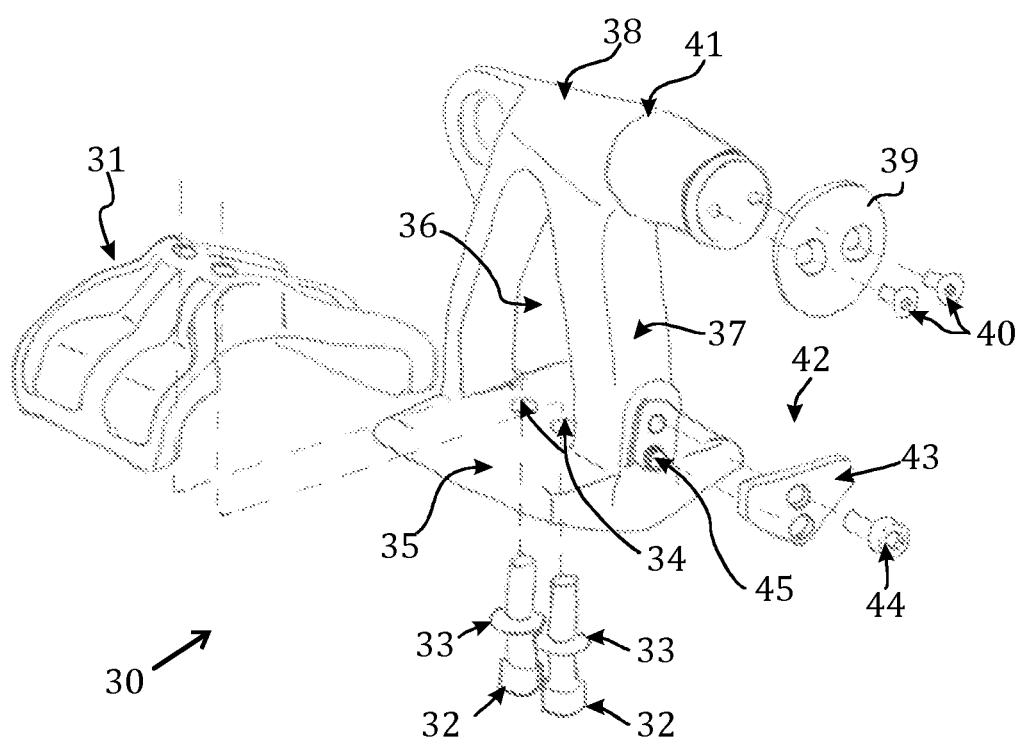
FIG. 8 shows another embodiment of a suspender which may be used in the frame structure of a hoist of FIGS. 1-5.

FIG. 8 shows another embodiment of a suspender which may be used in the frame structure of a hoist of FIGS. 1-5. The embodiment of FIG. 8 largely corresponds to the embodiment of FIGS. 6 and 7, wherefore in the following the embodiment of FIG. 8 will be explained primarily by disclosing differences between these embodiments. In FIG. 8, the locking of the suspender and the support frame structure is implemented by a bolt locking 30. The bolt locking 30 comprises a clamp part 31 and at least one fastener 32. The embodiment of FIG. 8 comprises two fasteners, which may be bolts, for example. Furthermore, the bolt locking 30 may comprise base plates 33 for the bolts 32. In FIG. 8 the bolts 32 are arranged to lock the suspender to the support frame structure 2 with the clamp part 31 wherein the bolts 32 are arranged vertically through holes 34 in a lower part 35 of the suspender, as shown in FIG. 8. The suspender of FIG. 8 comprises an opening 36 in a middle part 37 of the suspender. The opening 36 is wide enough so that the clamp part 31 may be inserted through the opening 36 and on top of the lower part 35 of the suspender for locking the suspender to the support frame structure. Furthermore, an upper part 38 of the suspender comprises connecting means for connecting the suspender to the bearing wheel arrangement 3. The connecting means may comprise a connecting plate 39 and two fasteners 40, for example, as shown in FIG. 8. In addition, the upper part 38 of the suspender comprises a shoulder 41. In FIG. 8, the suspender is also connected to the bearing wheel arrangement 3 from its middle part 37 by a bolt and plate joint 42 comprising a plate 43, a bolt 44 and a protrusion 45 in the middle part 37 of the suspender.

The suspenders 4 detachably connected to both ends 21 of the support frame structure 2 may move steplessly in the longitudinal direction L of the support frame structure 2. Consequently the mutual distance s between the bearing wheels 5 fixed to the suspenders 4 may be adjusted by shifting the fastening points of the suspenders 4 on the support frame structure 2 closer to each other or further away from each other. Due to the adjustable distance s, a hoist may be suspended to be supported by main supports of different sizes.

FIGS. 1 to 4 show an embodiment of the bearing wheel arrangement 3, which comprises, on opposite sides of a hoist, at all times at least two arranged bearing wheels 5. Bearing wheels 5 on the same side of a hoist are at any one time arranged to the same suspender part 26 which is attached by the suspender 4 to the support frame structure 2. Supported by the bearing wheels 5, the entire hoist moves along the upper surface of the lower flange of the main support structure 12.

Figure 5:
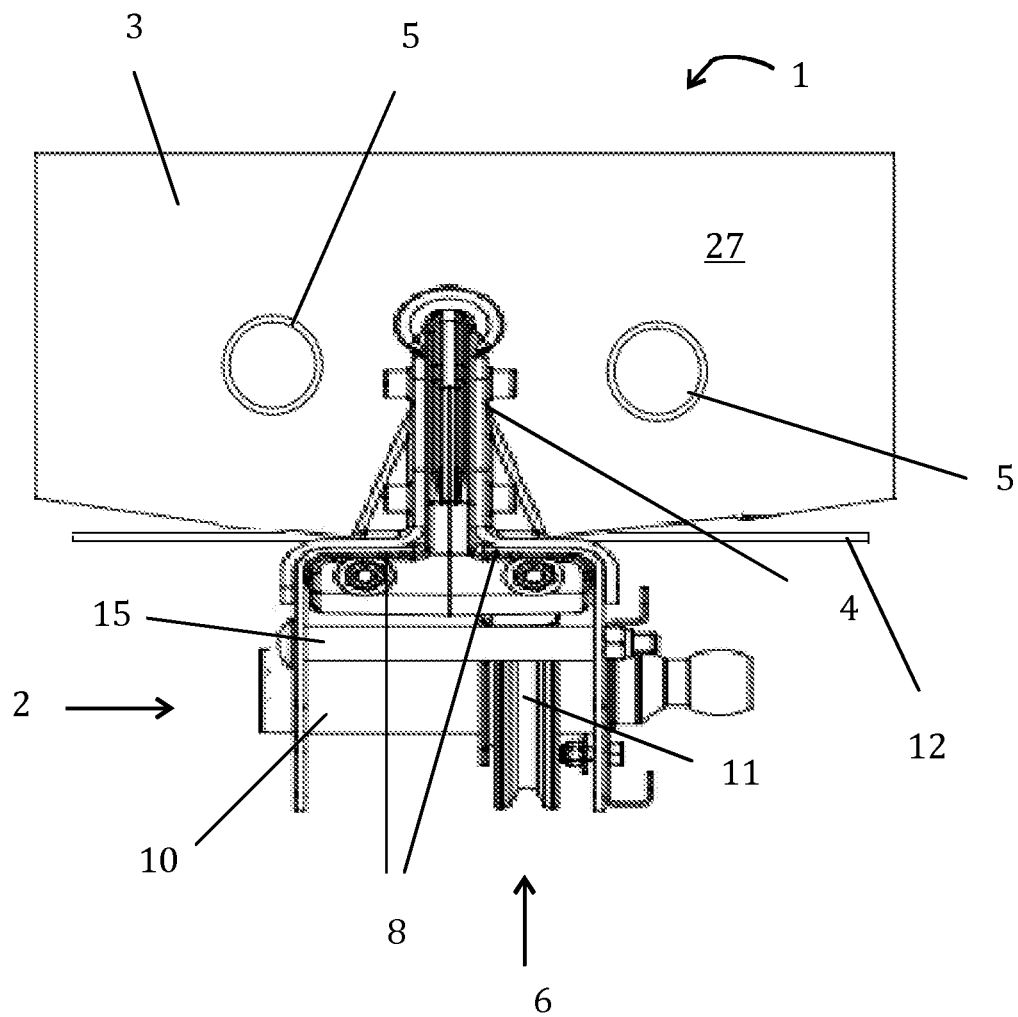
FIG. 5 is a side view of the frame structure of a hoist.

FIG. 5 shows an embodiment of the bearing wheel arrangement 3 where on opposite sides of the hoist in its direction of movement trolley flanges 27 have been arranged, on which the bearing wheels 5 connect. There are always at least two bearing wheels 5 on both sides. The bearing wheels 5 are located on the inner sides of the trolley flanges 27, facing the main support structure 12, and supported by which the trolley flanges 27 and consequently the entire hoist moves along the upper surface of the lower flange of the main support structure 12.

With the solution according to the invention, a small height dimension of the hoist is achieved, which enlarges the hoisting height. The distance of the upper roping components, such as the sheaves, to the main support structure can be made small with the solution.

The frame structure of the hoist allows the hoist to be adapted on the main support structure in a simple and fast manner. The distance between bearing wheels and their suspension parts adapted on opposite sides of the main support structure, or the trolley flanges, is continuously adjustable. This improves the installability and maintainability of the hoist.

A support frame structure formed of plates has a lower weight than the conventional frame structure. This, too, for its part improves the installability and maintainability of the hoist.

Parts list: 1 frame part of a hoist; 2 support frame structure; 3 bearing wheel arrangement; 4 suspender; 5 bearing wheel; 6 upper sheave arrangement; 7 plate of support frame structure; 8 upper part of plate 9; gap; 10 axle; 11 sheave; 12 main support structure; 13 fastening point; 14 joining point; 15 spacer; 16 upper part; 17 middle part; 18 lower part; 19 screw joint; 20 hoisting lug; 21 end; 22 upper reinforcement plate; 23 lower reinforcement plate; 24 wedge part; 25 compartment; 26 suspension part; 27 trolley flange; 28 axle joint; 29 wedge locking.

h height direction; L longitudinal direction; s distance between bearing wheels; x direction of movement.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. A frame structure of a hoist, the frame structure comprising a support frame structure, a bearing wheel arrangement fastened to the support frame structure by suspenders to support the hoist on a main support structure and to move the hoist on the main support structure, whereby the bearing wheel arrangement comprises, in the movement direction of the hoist, bearing wheels arranged on opposite sides thereof, and upper sheave arrangements secured to the support frame structure, wherein the support frame structure comprises two plates arranged opposite to and at a distance from each other, the upper parts of the plates bent towards each other, and in the support frame structure there is arranged an axle passing through both plates, on which axle a sheave is arranged between the plates, and the bent upper parts of the plates are detachably fastenable by a wedge locking or by a bolt locking to the suspender in order to adjust the mutual distance between the bearing wheels arranged on opposite sides of the support frame structure by means of the suspenders.

2. The frame structure as claimed in claim 1, wherein the upper part of the plate is bent into a substantially horizontal plane.

3. The frame structure as claimed in claim 1, wherein the plate of the support frame structure is bent in such a way that the plate is substantially L-shaped, and the plates of the support frame structure are mirror image profiles of each other.

4. The frame structure as claimed in claim 1, wherein a fastening point is arranged to the middle part of the plate of the support frame structure for a hoisting rope.

5. The frame structure of a hoist as claimed in claim 1, wherein a joining point is arranged to the middle part of the plate of the support frame structure for a rope drum of a hoisting rope.

6. The frame structure as claimed in claim 1, wherein the two plates of the support frame structure are arranged opposite to and at a distance from each other by means of bushings.

7. The frame structure as claimed in claim 1, wherein the suspender connects to the bearing wheel arrangement by an axle joint.

8. The frame structure as claimed in claim 7, wherein the suspender connects by its middle part to the bearing wheel arrangement by a screw joint.

9. The frame structure as claimed in claim 1, wherein the suspender comprises an upper part, a middle part, and a lower part, and the lower part is arranged on the inside of the support frame structure, and the middle part and upper part protrude from a gap formed between the bent upper parts of the plates of the support frame structure.

10. The frame structure as claimed in claim 9, wherein upper reinforcement plates are fastened to the middle part of the suspender, and the lower part of the suspender comprises a lower reinforcement plate and wedge parts thereon, and the bent upper part of the plate of the support frame structure is arranged between the upper reinforcement plate and the wedge parts.

11. The frame structure as claimed in claim 1, wherein the bearing wheel arrangement comprises on opposite sides of the hoist, at all times at least two arranged bearing wheels, and the bearing wheels on the same side of the hoist are at any one time arranged on the same suspension part which is fastened by the suspender to the support frame structure.

12. The frame structure as claimed in claim 1, wherein the bearing wheel arrangement comprises, in the movement direction of the hoist, trolley flanges arranged on opposite sides thereof and having the bearing wheels.

* * * * *